Dec. 12, 1967 W. PABST ETAL 3,358,202
VERNIER EQUIPPED DIGITAL POSITIONING APPARATUS
Filed July 6, 1964 2 Sheets-Sheet 1

Inventors:
Wolfgang Pabst
Peter Boese
By: Spencer & Kaye
ATTORNEYS

United States Patent Office 3,358,202
Patented Dec. 12, 1967

3,358,202
VERNIER EQUIPPED DIGITAL POSITIONING APPARATUS
Wolfgang Pabst and Peter Boese, Neu-Isenburg, Germany, assignors to Licentia Patent-Verwaltungs-G.m.b.H., Frankfurt am Main, Germany
Filed July 6, 1964, Ser. No. 380,406
Claims priority, application Germany, July 6, 1963, L 45,278
8 Claims. (Cl. 318—18)

ABSTRACT OF THE DISCLOSURE

A vernier equipped apparatus for automatically digitally positioning a part, such as a component of a machine tool, on the basis of a given nominal value. The component to be positioned has a coarse scale, there being a vernier device carrying a fine scale and a scanning device which locks onto a marker of an evenly divided index scale which is also carried by the component. As soon as the vernier device is properly positioned with respect to the main component, the two are locked together so that the coarse and fine scales will be effectively combined to form a unitary multiple-track scale which is read out by means of two scanning devices associated with the coarse and fine scales. The scanning devices are interconnected by a logic circuit.

---

The present invention relates to the positioning, or to the measurement of the position, of parts, especially machine components, by means of binary coded scales. Such positioning, or measurement of position, finds application in machine tools or the like in which a movable component is positioned with the aid of automatic digitally controlled positioning systems.

There exist control systems for numerically controlling various types of machinery, such as work tools, in which a movable component, such as a drill of a drilling machine, the cutting element of a planer or shaper, the electrode of a spot welder, the dies of a punching machine, and so on, is to assume a certain desired or intended position, the so-called nominal position, with respect to the work piece to be worked. The instantaneous actual position is measured with a suitable measuring system and the read-out value produced by this measuring system is compared with the nominal position, the latter being derived from the programming of the system. A signal derived from the deviation of the actual position from the nominal position causes an appropriate displacement of the movable component so as to bring it from the particular position it occupies to the correct position.

The machine tool may be so contructed that the movement occurs along a Cartesian coordinate or a polar coordinate system, and recent developments have shown that the best results are obtained if the position of the movable component is measured by means of binary coded multiple-track scales or discs. These scales may be arranged on the movable component, and are scanned by a suitable read-out device, as, for example, photoelectric means. In this way, the absolute position of the movable component relative to the frame or base of the machine may be determined, with the accuracy of the measurement being, in the final analysis, limited by the resolution of the measuring system. The resolution of a system involving binary coded scales, which include a plurality of tracks of which each successive one has twice as many divisions as its predecessor so that the scale can be said to range from a coarsest to a finest track, will depend on the size of the divisions of the finest track.

In the case of a translatorily moving component, the length of the coded scale will have to be equal to the distance throughout which the component is to travel, so as to enable such component to be positioned anywhere along its path of travel, or to enable the position of such component to be measured at any point along its path of travel. But this means that the scale will have to have its finest track extend throughout the entire distance, in order that the scale will provide he maximum resolution. Experience has shown that the manufacture and mounting of such finely divided scales is very complicated and expensive; for technological as well as economic reasons, the resolution of such long scales is limited to about 5 $\mu$m. (1 $\mu$m.=10$^{-6}$ meters).

One way of obtaining a very accurate measurement of position is first to measure the approximate position by means of a coarse scale and then to obtain a more accurate reading, with a precision not attainable by means of the coarse scale, by using a fine scale. In doing so, however, the fine scale has to be positioned manually with respect to the coarse scale.

There also exists a way in which the positioning is accomplished automatically. This is done by positioning very accurately the line of an evenly divided scale, while the fine adjustment is made in an analogous manner by means of the output voltage of a potentiometer which is coupled to the fine adjustment drive. This method does not operate purely digitally, which, of course, represents a practical drawback insofar as the application of this method is concerned, because, in order to obtain the very high degree of accuracy demanded by present day manufacturing requirement, the system has to be such as to enable it to function digitally throughout. Another drawback is that the precision depends on the accurate positioning on that line of the coarse scale which comes closest to the nominal value, it being only then that the actual fine adjustment is made.

It is, therefore, the object of the present invention to provide an apparatus for automatically digitally positioning a part, particularly the component of a machine tool, on the basis of a given nominal value, as well as to provide a way in which the position of such a part can be determined, which apparatus is able to operate with a high degree of accuracy but which does not require a fine scale that extends over the entire range of movement of the component which is to be positioned or whose position is to be measured.

With the above object in view, the present invention resides, basically, in an apparatus in which the main component which is to be positioned, or whose position is to be measured, is provided with a coarse scale, there being a vernier device which carries a fine scale and which itself carries a scanning device which, in a manner of speaking, locks onto a marker of an evenly divided index scale which is also carried by the main component. As soon as the vernier device is properly positioned with respect to the main component, the two are locked together, so that the coarse and fine scales will be effectively combined to form together a unitary multiple-track scale which is read out by means of the two scanning devices associated with the coarse and fine scales, these two scanning devices being suitably interconnected with each other by a logic circuit. In this way, the fine scale has to extend throughout but a very small fraction of the distance throughout which the main component is to be positioned, or throughout which the position of the main component is to be measured.

Additional objects and advantages of the present invention will become apparent upon consideration of the following description when taken in conjunction with the accompanying drawings in which.

Figure 1:
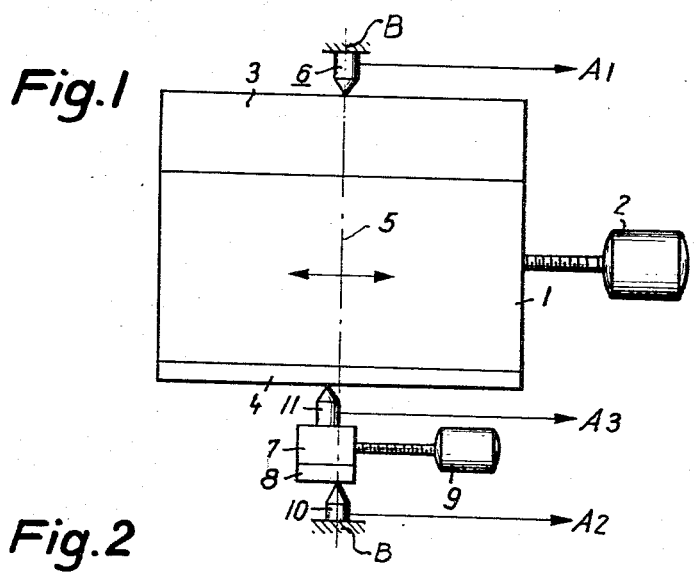
FIGURE 1 is a diagrammatic view showing the arrangement according to the present invention.

Referring now to the drawings and to FIGURE 1 thereof in particular, the same shows a main component such as a slidable support 1 of a machine tool, the support 1 being the movable component of the machine which carries, for example, the work tool which is to machine a work piece, or which carries the work piece and moves it relative to the work tool. The support is mounted on the machine frame or base B for movement in the direction of the double arrow and is moved, i.e., positioned, by means of a positioning motor 2 so that the support 1 can be made to occupy any position along the direction indicated by the double arrow. While, for purposes of clarity, the support 1 is shown to be movable rectilinearly and along but one coordinate (namely, the direction represented by the double arrow), it will be understood that the support may be, and in practice often is, mounted for movement along two or even three coordinates (Cartesian or polar), in which case separate positioning means and separate position measuring means, will be provided for each coordinate.

The support 1 carries a coarse binary scale 3 (shown per se in FIGURE 2) and an indexing scale 4 (shown per se in FIGURE 2a), both of which scales are made of transparent material and, at those places which are to represent binary "1" are either blackened or are provided with a thin metal coating which may be applied by vaporization. The gaps between the 1's are blank and represent binary "0." The individual tracks of the scale 3, identified in FIGURE 2 by $A_{11}$ through $A_{18}$, are read out by means of conventional photoelectric means 6 which are fixedly mounted on the machine tool, i.e., which are stationary with respect to the movable component and the scale carried thereby. The photoelectric means include a plurality of photoelements, one of which is positioned along a given reference or read-out line, identified in FIGURE 1 at 5, the other photoelements being arranged to the right and left of this line, i.e., either leading or lagging with respect to the element that is on the read-out line. This arrangement of the photoelements, known as the V-type or Kliever-type scanning, which is conventional and avoids spurious reading at junctions at which a plurality of tracks change over from one signal to another, puts out a signal representing the position of the scale, and hence of the movable component.[1] This output signal is indicated, collectively, at $A_1$.

The arrangement according to the present invention further includes a vernier device which includes a second support 7, mounted for movement in a direction parallel to that in which the support 1 moves. This support 7 carries a fine scale 8 (shown per se in FIGURE 2b), which scale is also made of a transparent material, e.g., glass, and is moved by a second positioning motor 9. The tracks of the scale 8 are read out by means of a further photoelectric read-out device 10 whose stationary photoelements, each of which is assigned to a respective track, are likewise arranged for V-type scanning and put out a signal represented, collectively, at $A_2$. The support 7 further carries a photoelectron microscope 11 which is fixedly mounted on the support 7 for movement therewith. The microscope 11 scans the single track of scale 4, and puts out a signal $A_3$, as will be described below.

Figure 2:
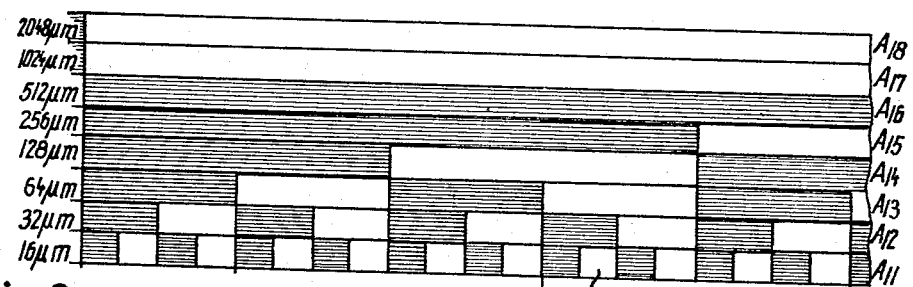
FIGURE 2 shows the coarse scale carried by the main component.
Figure 2A:
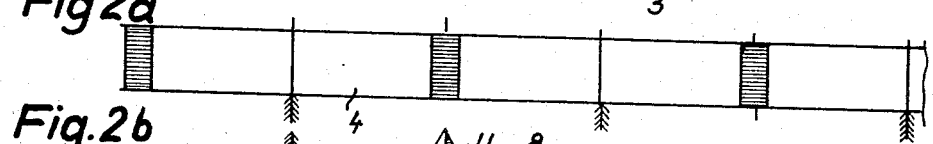
FIGURE 2a shows the evenly divided index scale which is also carried by the main component.
Figure 2B:
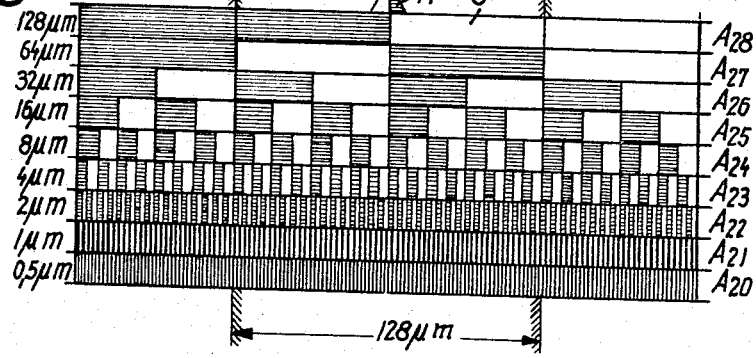
FIGURE 2b shows the fine scale which is carried by the vernier device.

The finest track $A_{11}$ of the coarse scale 3 is divided into alternate black-white divisions, hereinafter referred to as "marks" and "gaps," each of which has a length of 16 $\mu$m. The marks and gaps of the next higher order track $A_{12}$ each have a length of 32 $\mu$m., and each successive higher order track has divisions twice as long as the divisions of the preceding lower order track, as shown at the left of FIGURE 2.

The divisions of the finer tracks $A_{20}$ to $A_{24}$ of the fine scale 8 are smaller than those of the coarse scale 3 with the finest track $A_{20}$ having divisions 0.5 $\mu$m. long. The fine scale 8 additionally has tracks $A_{25}$ to $A_{27}$ whose marks and gaps have the same lengths as the marks and gaps of tracks $A_{11}$ to $A_{13}$ of the coarse track.

The division of the indexing scale 4 is equal to the division of the second coarsest track $A_{27}$ of the fine scale 8. The purpose of track $A_{28}$ will be explained below.

The photoelectron microscope 11 contains a periodically oscillating read-out wire, and the output signals $A_3$ will assume a value other than a given norm as soon as this wire no longer oscillates symmetrically with respect to one of the marks of the indexing scale 4.[2]

The signals derived from the read-out devices 6, 10, and 11 are processed for purposes of positioning the support 1, or for obtaining a measurement of the position. This is accomplished by the systems shown in FIGURES 3 and 4, respectively, in both of which the signals produced by the individual photoelements of the read-out devices 6 and 10 are identified by the reference character identifying the respective track.

Figure 3:
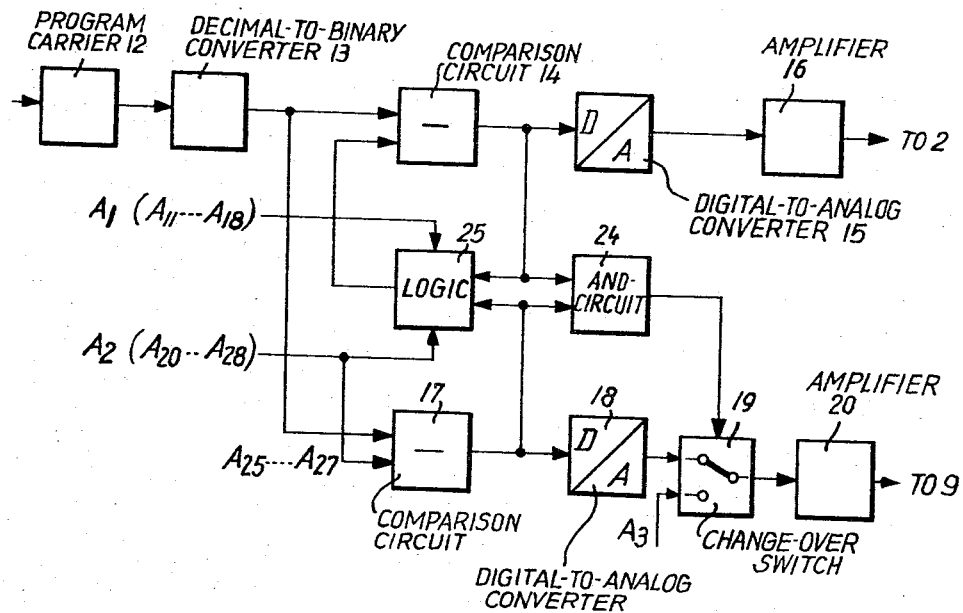
FIGURE 3 is a block diagram of a circuit by means of which the main component may be positioned in response to a program.

FIGURE 3 shows the system as including a program carrier 12, e.g., punched tape, which contains the stored nominal value of the position which the support 1 is to occupy. If the program is in decimal form, it is converted in a decimal-to-binary converter 13 so as to appear in natural binary form. The output of the converter 13 is applied to one input of a comparison (subtracting) circuit 14. The other input of circuit 14 is connected to the output of a logic circuit 25, the same being connected to receive the outputs $A_1$ and $A_2$. The logic circuit thus delivers the processed output $A_1$ (signals corresponding to tracks $A_{11}$ to $A_{18}$) to comparison circuit 14 on prepositioning of the support 1. After changing switch 19 it delivers, additionally, part of output $A_2$ (signals corresponding to tracks $A_{20}$ to $A_{24}$) to comparison circuit 14. The arrangement is such that when the actual position of the support 1, as determined by means of the coarse scale 3, i.e., as determined on the basis of the output $A_1$, differs from the nominal position, a control signal is put out by circuit 14 which, via a digital-to-analog converter 15 and an amplifier 16, is applied as a command signal to the positioning motor 2, so that the motor 2 will continue to change the position of the support 1 until the actual position of the support 1 (as accurately as can be measured by means of the scale 3) is equal to the nominal value, i.e., until the difference between the two values is equal to zero. In practice, the arrangement can be such that as the actual value approaches the nominal value, the positioning is effected in a slow-speed or so-called creeping or "inching" operation.

At the same time as the support 1 is thus being positioned, on the basis of the measurement obtained by means of the coarse scale 3, the vernier support 7, and with it the fine scale 8, is pre-positioned. This pre-positioning is effected by means of a second comparison (subtracting) circuit 17 which has applied to it nominal values from the output of the converter 13 and also those signals of output $A_2$ which are derived from tracks $A_{25}$ to $A_{27}$ and are processed by a logic circuit connected to the V-type scanning of tracks $A_{25}$ to $A_{27}$. The output of cir-

---

[1] The V-type scanning may operate in a manner well known in the art and described by W. H. Kliever on pp. 107–113, J. "Control Engineering," vol. 3, No. 11, 1956.

[2] The photoelectron microscope may operate in a manner well known in the art and described in detail in Patents Nos. 2,882,420 and 3,100,846.

cuit 17 is applied to a second digital-to-analog converter 18, whose output, in turn, is applied to positioning motor 9 via a change-over switch 19 and an amplifier 20. The vernier support 7 is thus pre-positioned to lie within its vernier adjustment range of ±0.128 mm., so that after this pre-positioning, its position will correspond, approximately—as a multiple of 16 μm.—to the nominal position of the main support 1 after its coarse pre-positioning.

As the main support 1 approaches its nominal value, one of the markers of the indexing scale 4 will be picked up by the photoelectron microscope 11 which, as the result of the pre-positioning of the vernier support 7, will now be in approximate alignment with such marker. The output $A_3$ of the electron microscope is now switched into the circuit, this being brought about when both of the comparison circuits 14 and 17 indicates zero difference, as follows: the outputs of circuits 14 and 17 are applied to the two inputs of an AND-circuit 24 which, when it receives from each of the two comparison circuits 14, 17, a signal to the effect that each measures a zero difference, applies a command pulse to the control input of the change-over switch 19, thereby to cause the same to move from the position shown in FIGURE 3 into its other position. In this way, the output signal $A_3$ of the electron microscope is now applied, via amplifier 20, to the positioning motor 9 so that the latter will now cause such movement of the vernier support 7 that the microscope will remain in alignment with the center of the particular marker that has been picked up. In this way, the coarse and fine scales will be coupled or "locked" to each other via the just-described electric follow-up circuit. In other words, since the markers of the index scale 4 are so positioned with respect to the tracks of the coarse scale 3 as the scanner of the tracks of the fine scale 3, the two now-locked scales can, for all practical purposes, be considered as a single, unitary scale having both coarse and fine tracks. The logic conditions to construct the logic circuit 25 are described on pp. 107–113, J. "Control Engineering," vol. 3, No. 11, 1956.

The scanners of the two scales are so connected together that the measured value of the 64 μm./64 μm. track $A_{27}$ of the fine scale 3 controls the V-scanning of the 128 μm./128 μm. track $A_{14}$ of the coarse scale 3. Thanks to this transistion of track $A_{27}$ of the fine scale to the already relatively coarse track $A_{14}$ of the coarse scale 3, it is no longer essential that the markers of the index scale 4 be correlated to given points of the coarse scale with the accuracy of the finest tracks $A_{11}$ to $A_{13}$ of the coarse scale. In this way, the actual position may be measured with the accuracy of the finest track $A_{20}$ of the fine scale, i.e., the 0.5 μm./0.5 μm. track. The main support can now be fine-positioned, since the actual position can be measured with the accuracy of the finest track. The comparison circuit 14 now compares all of the bits of both the nominal and actual values, and causes the motor 2 to position the support 1 accordingly. The motor 2 is switched off when the nominal and actual values are equal to each other.

It will be seen from the above that the fine scale has to extend throughout only a very short stretch of the entire distance throughout which the main support 1 is to be positioned.

In practice, the coarse and fine scales will be locked to each other, automatically, without appreciable time loss.

Figure 4:
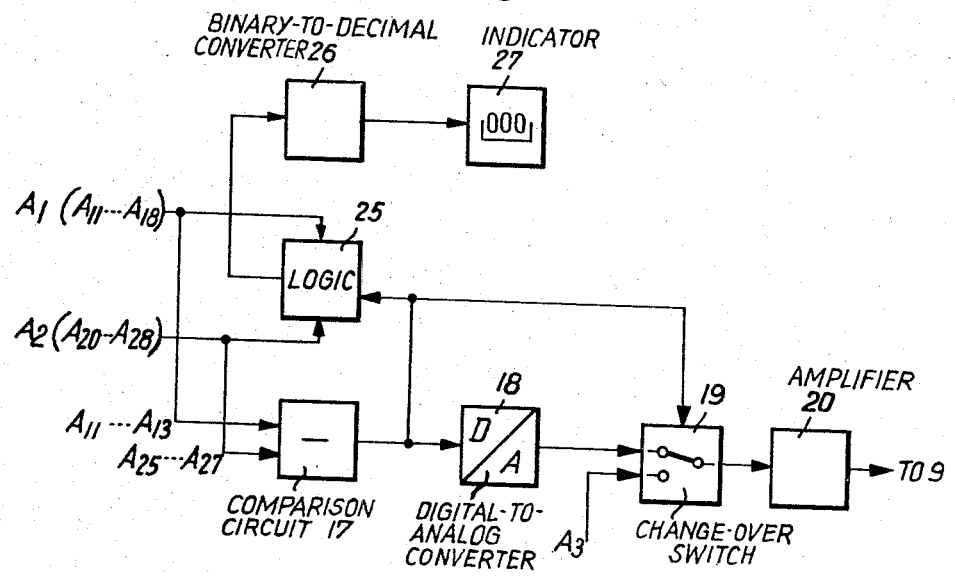
FIGURE 4 is a block diagram of a circuit by means of which the position of the main component may be measured.

If only a measurement of the actual position of the main support 1 is to be made, only part of the circuitry of FIGURE 3 is needed, as shown in FIGURE 4. By reading the finest tracks of the coarse scale, the position of the main support 1, and with it a marker of the index scale 4, may be fixed, within a range of 128 μm, to an accuracy of ±8 μm. The vernier support 7, and with it the fine scale 8, are pre-positioned with the same accuracy, with only the coarser tracks of the fine scale being scanned. As before, the comparison circuit 7 acts via the digital-to-analog converter 18, the change-over switch 19 and the amplifier 20 to apply appropriate signals to the positioning motor 9 of the vernier support 7. No AND-circuit comparable to 24 is needed, since the output of the comparison circuit 17 is connected directly to the control input of the change-over switch 19, so as to cause the same to switch in output $A_3$ as soon as the values being compared by circuit 17 are equal. This will occur after the vernier support has been pre-positioned. The microscope 11 then picks up the marker which is within the pick-up range of the scanning wire. The vernier support, and with it the fine scale, will thus be locked to the marker. The main and vernier supports, and hence the coarse and fine scales, are now coupled via the electric follow-up circuit, and the logic circuit 25 puts out a signal representing the combined values as read off the coarse and fine scales so that the position of the main support can be measured with an accuracy of 0.5 μm. In practice, the output of logic circuit 25 may be applied to the input of a binary-to-decimal converter 26, whose output, in turn, is applied to a numerical decimal indicator 27.

The 256 μm. long, 128 μm./128 μm. track $A_{28}$ of the fine scale 8 is needed (the measuring range being 128 μm.) to make certain that the vernier support will be properly pre-positioned even if it should overshoot to such an extent as to bring it out of the intended 128 μm. range.

During positioning of the main support, the position of the scales will have to be compensated for, reference being had to a suitable compensating table. For this, the entire length over which the positioning is to take place may be divided into, for example, 16 regions within which certain compensating values will be added to the programmed nominal values. These compensating values will be stored and form part of the controlling.

It will be understood that the above description of the present invention is susceptible to various modifications, changes, and adaptations, and the same are intended to be comprehended within the meaning and range of equivalents of the appended claims.

What is claimed is:
1. The combination which comprises:
 (a) a base;
 (b) a main component mounted on said base for movement in a given direction;
 (c) a multiple-track binary coded coarse scale carried by said main component for movement therewith and extending in said direction, the length of said coarse scale being equal to the distance throughout which the position of said main component is to be measured;
 (d) first scanning means arranged on said base for reading said coarse scale;
 (e) an index scale having evenly spaced markers, said index scale being carried by said main component for movement therewith and extending in said direction, the length of said coarse scale also being equal to the distance throughout which the position of said main component is to be measured;
 (f) a vernier device mounted on said base for movement in said direction;
 (g) moving means connected to said vernier device for moving the same in said direction;
 (h) second scanning means carried by said vernier device for reading said index scale, said second scanning means being capable of picking up a marker of said index scale;
 (i) means for locking said second scanning means to a marker on an index scale picked up by said second scanning means thereby effectively to couple said vernier device to said main component;
 (j) a multiple-track binary coded fine scale having tracks finer than the finest track of said coarse scale, said fine scale being carried by said vernier device for movement therewith and extending in said direc- tion, the length of said fine scale being a fraction of said distance;

(k) third scanning means arranged on said base for reading said fine scale; and (l) output means connecting said first and third scanning means, whereby when said vernier device and said main component are locked together, said coarse and fine scales are effectively combined to form together a unitary multiple-track scale which is read out by said output means and whose finest tracks extend throughout but a fraction of the distance throughout which the position of said main component is to be measured.

2. The combination defined in claim 1 wherein said main component and said vernier device are mounted for translatory movement and wherein said scales are rectilinear.

3. The combination defined in claim 1 wherein said fine scale has additional tracks corresponding to the finest tracks of said coarse scale.

4. The combination defined in claim 3 wherein said means (i) comprise a comparison circuit for comparing so much of the output of said third scanning means which pertains to said additional tracks of said fine scale with so much of the output of said first scanning means as pertains to said corresponding finest tracks of said coarse scale, and a two-input change-over switch having its output connected to the input of said vernier device moving means, one input of said switch being connected to the output of said comparison circuit and the other input of said switch being connected to the output of said second scanning means, said switch being further connected to switch to its second input when said comparison circuit puts out a signal representing equality of its input signals, in consequence of which said vernier device moving means are thereafter controlled by said second scanning means.

5. The combination defined in claim 4 wherein said output means comprises a logic circuit to which the outputs of said first and third scanning means are connected, and means connected to the output of said logic circuit for giving a measurement of the position of said main component.

6. The combination defined in claim 3, further comprising additional moving means connected to said main component for moving the same in said direction.

7. The combination defined in claim 6, further comprising means connected to both of said moving means for coarsely pre-positioning said main component and said vernier device in response to a nominal value corresponding in fineness to that of the tracks common to said coarse and fine scales.

8. The combination defined in claim 6, wherein said means (i) and (l) include:

(1) first and second comparison circuits each having two inputs;

(2) means for applying nominal values to one input of each of said comparison circuits;

(3) a logic circuit connected to receive the outputs of said first and third scanning means;

(4) means for applying the output of said logic circuit to the other input of said first comparison circuit;

(5) means for applying to the other input of said second comparison circuit so much of the output of said third scanning means which pertains to said additional tracks of said fine scale;

(6) means for applying the output of said first comparison circuit to said logic circuit as well as to said main component moving means for moving the latter until the same is coarsely pre-positioned;

(7) a two-input change-over switch having its output connected to the input of said vernier device moving means, one input of said switch being connected to the output of said second scanning means, said switch further having a control input;

(8) means which is processed by a logic circuit and for applying the output of said second comparison circuit to said logic circuit as well as to the other input of said switch; and (9) an AND-circuit having two inputs connected to the outputs of said comparison circuits and an output connected to said control input of said switch for causing the latter to connect the output of said second comparison circuit to said vernier device moving means so long as both of said comparison circuits fail to put out a zero signal and to cause said switch to connect the output of said second scanning means to said vernier device moving means when both of said comparison circuits put out zero signals.

No references cited.

BENJAMIN DOBECK, *Primary Examiner.*